(12) United States Patent
Bleuel et al.

(10) Patent No.: US 7,759,521 B2
(45) Date of Patent: Jul. 20, 2010

(54) DEVICE FOR PRODUCING POLYETHER ALCOHOLS

(75) Inventors: Elke Bleuel, Dresden (DE); Monika Wetterling, Senftenberg (DE); Marita Schuster, Stemwede-Haldem (DE); Markus Templin, Lemfoerde (DE); Dieter Rodewald, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 196 days.

(21) Appl. No.: 10/567,451

(22) PCT Filed: Jul. 15, 2004

(86) PCT No.: PCT/EP2004/007864

§ 371 (c)(1),
(2), (4) Date: Feb. 7, 2006

(87) PCT Pub. No.: WO2005/014685

PCT Pub. Date: Feb. 17, 2005

(65) Prior Publication Data

US 2006/0258832 A1    Nov. 16, 2006

(30) Foreign Application Priority Data

Aug. 12, 2003 (DE) .............................. 103 37 319

(51) Int. Cl.
*C07C 213/00* (2006.01)
*C07C 213/04* (2006.01)
*C08G 18/48* (2006.01)

(52) U.S. Cl. .................. 564/505; 564/475; 528/76

(58) Field of Classification Search ................. 564/505, 564/475; 528/76
See application file for complete search history.

(56) References Cited

U.S. PATENT DOCUMENTS

| | | | | |
|---|---|---|---|---|
| 3,941,769 A | * | 3/1976 | Maassen et al. | ............. 536/120 |
| 6,423,759 B1 | * | 7/2002 | Schilling et al. | ............. 521/174 |
| 2003/0100699 A1 | * | 5/2003 | Waddington et al. | .......... 528/44 |

FOREIGN PATENT DOCUMENTS

| | | |
|---|---|---|
| DE | 147 469 | 4/1981 |
| DE | 235 878 | 5/1986 |
| EP | 0 539 819 | 5/1993 |
| EP | 0 708 126 | 4/1996 |
| WO | 01/58976 | 8/2001 |
| WO | 02/22702 | 3/2002 |
| WO | 02/50161 | 6/2002 |
| WO | 03/016372 | 2/2003 |
| WO | 03/029320 | 4/2003 |

* cited by examiner

*Primary Examiner*—Milton I Cano
*Assistant Examiner*—Benjamin J Gillespie
(74) *Attorney, Agent, or Firm*—Oblon, Spivak, McClelland, Maier & Neustadt, L.L.P.

(57) ABSTRACT

The present invention relates to a process for preparing autocatalytic polyether alcohols by reacting H-functional starter substances containing at least one amino group which is catalytically active in the urethane reaction, in particular a tertiary amino group, and at least one group which is reactive toward alkylene oxides, in particular a primary and/or secondary amino group and/or hydroxyl group, with alkylene oxides, which comprises
a) dissolving the starter substance in a solvent,
b) reacting the solution with alkylene oxides.

17 Claims, No Drawings

DEVICE FOR PRODUCING POLYETHER ALCOHOLS

Polyether alcohols have been known for a long time and are widely described in the literature. They are, in particular, processed further by reaction with polyisocyanates to give polyurethanes. They are usually prepared by adding alkylene oxides onto low molecular weight starter substances containing active hydrogen atoms.

A particular class of polyether alcohols is formed by those prepared using compounds containing amino groups as starter substances. Since tertiary amino groups catalyze the polyurethane reaction, such polyether alcohols act both as formative components for the polyurethanes and as catalyst. Compared to conventional, low molecular weight amine catalysts, such polyether alcohols, which are frequently also referred to as autocatalytic polyether alcohols, have the advantage that they cannot migrate out of the foams. The migration of amines from the foams leads to unpleasant odors and is therefore undesirable. A number of such autocatalytic polyether alcohols are known from the prior art.

As starter substances for autocatalytic polyether alcohols, it is possible to use compounds having primary, secondary and/or tertiary amino groups. In the reaction with the alkylene oxides, the primary and secondary amino groups are converted into tertiary amino groups. The catalytic activity of autocatalytic polyether alcohols whose starter substances originally contained tertiary amino groups is usually higher than that of polyether alcohols whose tertiary amino groups have been formed only by reaction of primary or secondary amino groups with alkylene oxides.

DD 235 878 describes autocatalytic polyether alcohols which are prepared by addition of alkylene oxides onto aliphatic tetramines having a low content of tertiary amino groups. Depending on the desired properties of the end products, the amines can be reacted immediately with the total amount of the alkylene oxide or successively with a plurality of partial amounts of the alkylene oxide.

WO 01/58976, WO 02/22702, WO 03/016372 and WO 03/29320 describe a large number of autocatalytic polyether alcohols which are prepared by addition of alkylene oxides onto various amines. These autocatalytic polyether alcohols are reacted, preferably in combination with other polyols, with isocyanates to give polyurethanes. They are prepared by conventional methods by addition of alkylene oxides onto the amines used as starter substance.

The use of the autocatalytic polyether alcohols enables the undesirable odor caused by the amines used as catalyst to be significantly suppressed. However, the polyether alcohols prepared according to the prior art still always contain by-products which can lead to odor problems with the polyurethanes. In addition, it has been found that the aging resistance of the polyurethanes produced using the conventional autocatalytic polyether alcohols is unsatisfactory.

It is an object of the present invention to develop autocatalytic polyether alcohols which are free of by-products and have a low odor and are simple to prepare.

We have found that this object is achieved by dissolving the amines used as starter substance in a solvent prior to the reaction with the alkylene oxides and reacting them with the alkylene oxides in solution.

The present invention accordingly provides a process for preparing autocatalytic polyether alcohols by reacting H-functional starter substances containing at least one amino group which is catalytically active in the urethane reaction, in particular a tertiary amino group, and at least one group which is reactive toward alkylene oxides, in particular a primary and/or secondary amino group and/or hydroxyl group, with alkylene oxides, which comprises
a) dissolving the starter substance in a solvent,
b) reacting the solution with alkylene oxides.

The invention further provides the polyether alcohols prepared by this process.

Furthermore, the invention provides a process for producing polyurethanes by reacting polyisocyanates with compounds having at least two hydrogen atoms which are reactive toward isocyanate groups, wherein at least one autocatalytic polyether alcohol which can be prepared by the process of the present invention is used as compound having at least two hydrogen atoms which are reactive toward urethane groups.

As solvent, it is possible to use any organic solvents. In one embodiment of the process of the present invention, organic solvents which are chemically inert toward alkylene oxides are used as solvent.

The boiling point of these inert organic solvents is preferably selected so that it is below the reaction temperature in the reaction of the starter substance with the alkylene oxides. In particular, the boiling point is at least 100° C. Examples of such organic solvents are toluene, monochlorobenzene, diethylene glycol dimethyl ether and triethylene glycol dimethyl ether.

The weight ratio of starter substance to solvent is preferably in the range from 1:20 to 20:1, particularly preferably from 1:1 to 1:10 and in particular from 1:1 to 1:5.

In this embodiment, the solvent should be removed after the reaction with the alkylene oxides since it can cause problems in the reaction of the polyether alcohols to form polyurethanes and can itself lead to undesirable odors.

In a preferred embodiment of the process of the present invention, polyether alcohols are used as solvent. As polyether alcohols, preference is given to using the products which are known and customary for the production of polyurethanes. Preferred polyether alcohols have a functionality in the range from 2 to 8 and a hydroxyl number in the range from 20 to 1200 mg KOH/g. The choice of the polyether alcohol used as solvent is preferably determined by the desired field of application of the autocatalytic polyether alcohols. Thus, in the case of autocatalytic polyether alcohols which are to be used for producing rigid foams, preference is given to using low molecular weight and high-functionality polyether alcohols. Such products preferably have a functionality in the range from 3 to 8 and a hydroxyl number in the range from 200 to 1200 mg KOH/g. Such products are generally known. They are preferably prepared by addition of lower alkylene oxides, in particular ethylene oxide and/or propylene oxide, onto starter substances containing alcohol and/or amine groups, e.g. glycerol, trimethylolpropane or sugars such as sucrose or sorbitol. In the case of autocatalytic polyether alcohols which are to be used for producing flexible foams, preference is given to using bifunctional to trifunctional polyether alcohols having a hydroxyl number in the range from 20 to 200 mg KOH/g, in particular from 20 to 100 mg KOH/g. Such products, too, are generally known. They are preferably prepared by addition of lower alkylene oxides, in particular ethylene oxide and/or propylene oxide, onto bifunctional and trifunctional alcohols such as glycerol, trimethylolpropane, ethylene glycol and homologues thereof and propylene glycol and homologues thereof.

In this embodiment of the process of the present invention, the alkylene oxides are surprisingly added largely selectively onto the H-functional starter substances containing at least one primary, secondary or tertiary amino group.

This leads firstly to a narrow molecular weight distribution of the autocatalytic polyether alcohol. In addition, secondary reactions during the addition of the alkylene oxides onto starter substances containing amine groups are suppressed to a significant extent.

When polyether alcohols are used as solvent, various embodiments of the process are possible.

In one embodiment, a fully worked up and purified polyether alcohol is used. In this case, the addition of the alkylene oxides onto the starter substance containing amine groups can be carried out utilizing only the catalytic properties of the starter substance, without addition of further catalysts. This embodiment has the advantage that work-up of the polyether alcohol after the addition reaction of the alkylene oxides is not necessary. A disadvantage here is the low reaction rate of the addition reaction. The reaction rate can be increased by addition of basic catalysts, but in this case it is usually necessary for the basic catalyst to be removed afterward.

In another, preferred embodiment of the process of the present invention, an unpurified polyether alcohol which still contains basic catalyst is used as solvent. The basic catalyst is one of the alkaline catalysts customarily used for preparing polyether alcohols, for example cesium hydroxide, sodium hydroxide and in particular potassium hydroxide. This catalyst is usually present in an amount of from 0.1 to 3.0% by weight, based on the weight of the unpurified polyether alcohol.

After the addition of the alkylene oxides and an after-reaction time which usually follows to allow the alkylene oxides to react completely, the autocatalytic polyether alcohol obtained is worked up in a customary fashion by neutralization of the basic catalyst and removal of the resulting salts.

The weight ratio of starter substance to polyether alcohol is preferably from 1:20 to 20:1, particularly preferably from 1:1 to 1:10 and in particular from 1:1 to 1:5.

As starter substances containing amine groups, it is possible, as indicated above, to use all amines which catalyze the urethane reaction. Preference is given to using compounds having at least one tertiary amino group, in particular a dialkylamino group, and at least one functional group which can react with alkylene oxides. The functional groups which can react with alkylene oxides can be any H-functional groups. They are preferably hydroxyl groups or primary and/or secondary amino groups.

As starter substances containing amine groups, it is in principle possible to use all compounds described, for example, in WO 01/58976, WO 02/22702, WO 03/016372 and WO 03/29320.

Preferred starter substances containing amine groups are aliphatic amines having at least one tertiary amino group and an H-functional group.

The starter substance containing amine groups is preferably selected from the group consisting of dimethylaminoethylamine, dimethylaminopropylamine, diethylaminoethylamine, diethylaminopropylamine, N-(3-dimethylaminopropyl)-N,N-diisopropanolamine, dimethylethanolamine, N,N-dimethylaminoethyl N'-methyl-N'-hydroxyethylaminoethyl ether, N,N-bis(3-dimethylaminopropyl)amino-2-propanolamine, bis(N,N-dimethyl-3-aminopropyl)amine, N,N-dimethylaminoethoxyethanol, N-(3-aminopropyl)imidazole, N-(2-dimethylaminoethyl)-N-methylethanolamine, N-(2-hydroxypropyl)imidazole, di-methylaminohexanol and mixtures of at least two of the compounds mentioned.

The process of the present invention is preferably carried out so that an average of from 1 to 8, preferably from 1 to 6, in particular from 2 to 4, molecules of the alkylene oxide are added onto each active hydrogen atom of the starter substance containing amine groups.

The reaction of the starter substance With the alkylene oxides is carried out at the customary pressures in the range from 0.1 to 1.0 MPa and the customary temperatures in the range from 80 to 140° C. The introduction of the alkylene oxides is usually followed by an after-reaction phase to allow the alkylene oxides to react completely. The catalytic activity of the amines is usually sufficient to bring about the addition reaction of the alkylene oxides. If necessary, additional catalysts can be added. These are, in particular, basic, preferably alkaline, catalysts.

After the addition of the alkylene oxides and the after-reaction phase, the polyether alcohols are, if necessary, freed of catalyst.

The autocatalytic polyether alcohols prepared by the process of the present invention can be reacted alone or preferably in combination with other compounds having at least two hydrogen atoms which are reactive towards isocyanate groups to give polyurethanes.

As compounds having at least two active hydrogen atoms which can be used together with the autocatalytic polyether alcohols of the present invention, it is possible to use, in particular, polyester alcohols and preferably polyether alcohols having a functionality of from 2 to 8, in particular from 2 to 6, preferably from 2 to 4, and a mean molecular weight in the range from 400 to 10 000 g/mol, preferably from 1000 to 8000 g/mol. The content of the autocatalytic polyether alcohols of the present invention in the compounds having at least two hydrogen atoms which are reactive toward isocyanate groups is preferably in the range from 0.1 to 20% by weight, particularly preferably from 0.5 to 10% by weight, based on the weight of all compounds having at least two hydrogen atoms which are reactive toward isocyanate groups.

The polyether alcohols can be prepared by known methods, usually by catalytic addition of alkylene oxides, in particular ethylene oxide and/or propylene oxide, onto H-functional starter substances, or by condensation of tetrahydrofuran. H-functional starter substances used are, in particular, polyfunctional alcohols and/or amines. Preference is given to using water, dihydric alcohols, for example ethylene glycol, propylene glycol or butanediols, trihydric alcohols, for example glycerol or trimethylolpropane, and also higher-functionality alcohols such as pentaerythritol, sugar alcohols, for example sucrose, glucose or sorbitol. Preferred amines are aliphatic amines having up to 10 carbon atoms, for example ethylenediamine, diethylenetriamine, propylenediamine, and also amino alcohols such as ethanolamine or diethanolamine. As alkylene oxides, preference is given to using ethylene oxide and/or propylene oxide, with an ethylene oxide block frequently being added on at the end of the chain in the case of polyether alcohols which are used for producing flexible polyurethane foams. Catalysts used in the addition reaction of the alkylene oxides are, in particular, basic compounds, with potassium hydroxide having the greatest industrial importance here. When a low content of unsaturated constituents in the polyether alcohols is wanted, it is also possible to use multimetal cyanide compounds, known as DMC catalysts, as catalysts.

For particular applications, especially for increasing the hardness in flexible polyurethane foams, it is also possible to use polymer-modified polyols. Such polyols can be prepared, for example, by in-situ polymerization of ethylenically unsaturated monomers, preferably styrene and/or acrylonitrile, in polyether alcohols. Polymer-modified polyether alcohols also include polyether alcohols containing polyurea dispersions, which are preferably prepared by reacting amines with isocyanates in polyols.

To produce flexible foams and integral foams, use is made, in particular, of bifunctional and/or trifunctional polyether alcohols. To produce rigid foams, use is made, in particular, of polyether alcohols which are prepared by addition of alkylene oxides onto tetrafunctional or higher-functionality starters such as sugar alcohols or aromatic amines.

The compounds having at least two active hydrogen atoms also include the chain extenders and crosslinkers which may be used concomitantly. As chain extenders and crosslinkers, preference is given to using 2- and 3-functional alcohols having molecular weights of less than 400 g/mol, in particular in the range from 60 to 150 g/mol. Examples are ethylene glycol, propylene glycol, diethylene glycol, 1,4-butanediol, glycerol and trimethylolpropane. As crosslinkers, it is also possible to use diamines. If chain extenders and crosslinkers are used, they are preferably used in an amount of up to 5% by weight, based on the weight of the compounds having at least two active hydrogen atoms.

As polyisocyanates, it is possible to use the customary and known aromatic diisocyanates and polyisocyanates, either individually or in any mixtures with one another. Examples of aromatic diisocyanates or polyisocyanates are tolylene 2,4-diisocyanate (2,4-TDI), tolylene 2,6-diisocyanate (2,6-TDI), diphenylmethane 2,4'-diisocyanate (2,4'-MDI), diphenylmethane 4,4'-diisocyanate (4,4'-MDI), polyphenylpolymethylene polyisocyanates as are prepared by condensation of aniline and formaldehyde and subsequent phosgenation (polymeric MDI), p-phenylene diisocyanate, toluidine diisocyanate, xylylene diisocyanate and naphthylene 1,5-diisocyanate (NDI).

Together with or in place of these monomeric isocyanates or mixtures thereof, it is possible and indeed preferred to use oligoisocyanates or polyisocyanates prepared therefrom, known as prepolymers, in particular prepolymers based on TDI and MDI. These oligoisocyanates or polyisocyanates can be prepared from the abovementioned diisocyanates or polyisocyanates or mixtures thereof and, if appropriate, monoalcohols or polyalcohols by linkage by means of urethane, allophanate, urea, biuret, uretdione, amide, isocyanurate, carbodiimide, uretonimine, oxadiazinetrione or iminooxadiazinedione structures. Preference is given to using polymers derived from TDI or MDI and, if appropriate, monoalcohols or polyalcohols and having urethane, allophanate, carbodiimide, uretonimine, biuret or isocyanate groups.

To produce the polyurethanes, it is possible to make concomitant use of further starting materials, in particular further catalysts, blowing agents and auxiliaries and/or additives, about which the following details may be provided:

As catalysts for producing the polyurethane foams according to the present invention, it is possible to use the customary and known polyurethane formation catalysts, for example organic tin compounds such as tin diacetate, tin dioctoate, dialkyltin dilaurate, and/or strongly basic amines such as triethylamine, pentamethyldiethylenetriamine, bis(dimethylaminoethyl) ether, imidazoles or preferably triethylenediamine, in combination with the autocatalytic polyether alcohols. The catalysts are preferably used in an amount of from 0.01 to 5% by weight, preferably from 0.05 to 2% by weight.

As blowing agent for producing the polyurethane foams, preference is given to using water which reacts with the isocyanate groups to liberate carbon dioxide. Together with or in place of water, it is also possible to use physically acting blowing agents, for example carbon dioxide, hydrocarbons such as n-pentane, isopentane or cyclopentane, cyclohexane or halogenated hydrocarbons such as tetrafluoroethane, pentafluoropropane, heptafluoropropane, pentafluorobutane, hexafluorobutane or dichloromonofluoroethane. The amount of physical blowing agent is preferably in the range from 1 to 15% by weight, in particular from 1 to 10% by weight, and the amount of water is preferably in the range from 0.5 to 10% by weight, in particular from 1 to 5% by weight.

Auxiliaries and/or additives used are, for example, surface-active substances, foam stabilizers, cell regulators, external and internal mold release agents, fillers, flame retardants, pigments, hydrolysis inhibitors and fungistatic and bacteriostatic substances.

In the industrial production of polyurethane foams, it is customary to combine the compounds having at least two active hydrogen atoms and the further starting materials such as auxiliaries and/or additives to form a polyol component prior to the reaction.

Further information on the starting materials used may be found, for example, in the Kunststoffhandbuch, Volume 7, Polyurethane, edited by Günter Oertel, Carl-Hanser-Verlag, Munich, $3^{rd}$ Edition 1993.

To produce the polyurethanes according to the present invention, the organic polyisocyanates are reacted with the compounds having at least two active hydrogen atoms in the presence of the abovementioned blowing agents, catalysts and auxiliaries and/or additives, usually mixed together as a polyol component.

In the production of the polyurethanes, the isocyanate and polyol components are brought together in such an amount that the equivalence ratio of isocyanate groups to the sum of the active hydrogen atoms is from 0.6:1 to 1:1.4, preferably from 0.7:1 to 1:1.20.

The process of the present invention for preparing the autocatalytic polyether polyols results in a significant reduction in the formation of by-products. This is reflected, for example, in a reduced color number of the polyether alcohols. Here, the color decreases with increasing dilution of the starter substance containing amine groups in the solvent. Furthermore, the intrinsic odor of the polyether alcohols prepared by the process of the present invention is significantly lower than that of autocatalytic polyether alcohols prepared by conventional processes, even under standardized conditions, i.e. when these conventional catalytic polyether alcohols have been diluted to the same amine content by addition of polyether alcohols.

A further significant advantage of the autocatalytic polyether alcohols in whose preparation polyether alcohols have been used as solvent is, apart from the simple way in which they can be prepared, a simplification of stock management and logistics, since in this embodiment the polyether alcohol used as formative component for the polyurethanes itself has catalytic properties and for this reason no additional catalyst has to be used. The preparative method also results in optimal distribution of the autocatalytic polyether alcohol in the polyether alcohol used as solvent.

The invention is illustrated by the following examples.

EXAMPLE 1a 102.2 g (1 mol) of N,N-dimethylaminopropylamine were dissolved in 100 g of chlorobenzene and admixed with 0.2% by weight of solid potassium hydroxide. 348.5 g (6 mol) of propylene oxide were subsequently introduced. During the introduction of the propylene oxide, the temperature was in the range from 95 to 105° C., while during the after-reaction it was 95° C. The reaction mixture was vacuum stripped at about 98° C. for one hour. The vacuum was broken by means of nitrogen. The catalyst was removed by addition of Ambosol® in 2% by weight of water at room temperature and subsequent stirring at 90° C. for one hour. The reaction mixture was then filtered and the chlorobenzene was removed by distillation.

EXAMPLES 1b to 1f

Using a method analogous to example 1a, 102.2 g (1 mol) of N,N-dimethylaminopropylamine were dissolved in 300 g, 500 g and 1000 g of chlorobenzene (examples 1b, 1c, 1d) or 100 g and 500 g of diglyme (examples 1e and 1f) and admixed with 0.2% by weight of potassium hydroxide. 348.5 g (6 mol) of propylene oxide were subsequently introduced. The further work-up was carried out as described for example 1a using Ambosol®/water 2%.

The products from the reactions 1a to 1f were analyzed by GC. This showed that increasing dilution in the propoxylation of the amine starter, i.e. less drastic reaction conditions, enabled the amount of by-products to be reduced significantly. This is accompanied by a change in the color of the product. While the samples from starting compound and solvent in a ratio of 1:1 are brown, the products produced using mixing ratios of 1:5 and 1:10 are yellow and only slightly yellowish, respectively.

| Example | Target product (% by wt) |
|---------|--------------------------|
| 1a | 12.4 |
| 1b | 22.6 |
| 1c | 29.8 |
| 1d | 37.3 |
| 1e | 13.9 |
| 1f | 25.7 |

COMPARATIVE EXAMPLE 2

614 g (2.5 mol) of N,N-bis(3-dimethylaminopropyl) amino-2-propanolamine were admixed with 0.2% by weight of potassium hydroxide. 291 g (5 mol) of propylene oxide were subsequently metered in at 95-105° C. over a period of 100 minutes. The after-reaction was carried out at 95° C. The reaction mixture was subsequently worked up by a method analogous to example 1a using Ambosol®/water 2%.

EXAMPLE 3

According to the Present Invention 540 g of an alkaline polyether alcohol derived from glycerol, propylene oxide and ethylene oxide and having a total alkalinity of 0.29%, a hydroxyl number of 26.5 mg KOH/g and a functionality of 2.7 were admixed with 245 g (1 mol) of N,N-bis(3-dimethylaminopropyl)amino-2-propanolamine and the mixture was reacted with 116 g (2 mol) of propylene oxide without additional catalysis. The after-reaction was carried out at 95° C. The reaction mixture was subsequently worked up by a method analogous to example 1a using IAmbosol®/water 2%.

EXAMPLE 4

608 g of an alkaline polyether alcohol derived from glycerol, propylene oxide and ethylene oxide and having a total alkalinity of 0.38%, a hydroxyl number of 25 mg KOH/g and a functionality of 2.7 were admixed with 102 g of N,N-dimethylamino-propylamine and the mixture was reacted with 290 g of propylene oxide without additional catalysis.

The polyetherol formed was worked up in the usual fashion and used for producing flexible polyurethane foam. It displayed an excellent catalytic action in the polyurethane reaction.

EXAMPLE 5

605 g of alkaline polyol from example 4 were reacted with 245 g of propylene oxide. The polyetherol formed was worked up in the usual fashion and used for producing flexible polyurethane foam. It displayed an excellent catalytic action in the polyurethane reaction.

EXAMPLE 6

1080 g of alkaline polyol from example 4 were admixed with 491 g of N,N-bis(3-dimethylaminopropyl)-N-isopropanolamine and reacted with 264 g of ethylene oxide without additional catalysis.

The polyetherol formed was worked up in the usual fashion and used for producing flexible polyurethane foam. It displayed an excellent catalytic action in the polyurethane reaction.

EXAMPLE 7

1080 g of alkaline polyol from example 4 were admixed with 375 g of bis(N,N-dimethyl-3-aminopropyl)amine, and, without additional catalysis, reaced firstly with 349 g of propylene oxide and subsequently, without further work-up, with 88 g of ethylene oxide. The polyetherol formed was worked up in the usual fashion and used for producing flexible polyurethane foam. It displayed an excellent catalytic action in the polyurethane reaction.

EXAMPLE 8

Comparative Example

To produce a semirigid polyurethane foam, a polyol component composed of 46 parts by weight of Lupranol® 2090 (Elastogran GmbH), 45 parts by weight of Lupranol® 2095 (Elastogran GmbH), 2 parts by weight of 1,4-butanediol, 0.5 part by weight of triethanolamine, 3 parts by weight of a linear polyester (based on adipic acid, ethylene glycol, butanediol and Lupranat® M10R, OH number: 34), 0.3 part of a dimethylamino-propylamine-initiated polypropylene glycol (OH number: 250), 0.5 part of an emulsifier (based on a block polymer of maleic anhydride and a α-olefin modified with Lupranol® 2046 and a polyethylene oxide derivative), 0.05 part of Tegostab® B 8680 (Gold-schmidt), 2 parts of water and 1 part of the autocatalytic polyol from example 2 was mixed with an isocyanate component consisting of a prepolymer (NCO content: 28%) derived from Lupranat® MI, Lupranat® ME, Lupranat® M 20 W and Lupranol® 2047 (Elastrogan GmbH) at an index of 0.96 and the foaming mixture was poured into an aluminium mold having dimensions of 20 cm×20 cm×4 cm and heated to 44° C. to give a cushion having a density of 100 kg/m$^3$.

Testing of this foam in accordance with the test method VDA 278 indicated 20 ppm of emissions of molecules containing dimethylamino groups in the VOC value.

EXAMPLE 9

According to the Present Invention

A foam was produced in a manner analogous to example 8, but 3.94 parts of the autocatalytic polyol from example 3 were used in place of the one part of the autocatalytic polyol from example 2.

Testing of this foam in accordance with the test method VDA 278 indicated 0 ppm of emissions of molecules containing dimethylamino groups in the VOC value. The amine emissions of the foam are thus significantly reduced when autocatalytic polyols prepared according to the present invention are used.

We claim:

1. A process for preparing autocatalytic polyether alcohols comprising reacting H-functional starter substances containing at least one amino group which is catalytically active in the urethane reaction, and at least one group which is reactive toward alkylene oxides, with alkylene oxides, comprising
   a) dissolving the starter substance in a solvent,
   b) reacting the solution with alkylene oxides
   wherein said solvent is a polyether alcohol having a functionality from 2 to 3 and a hydroxyl number from 20 to 200 mg KOH/g.

2. The process as claimed in claim 1, wherein the solvent is a polyether alcohol having a hydroxyl number of from 20 to 100 mg KOH/g.

3. The process as claimed in claim 1, wherein a polyether alcohol which has been prepared by addition of alkylene oxides onto H-functional starter substances in the presence of an alkaline catalyst and from which said alkaline catalyst has not been removed after the addition reaction of the alkylene oxides is used as solvent.

4. The process as claimed in claim 1, wherein organic solvents which are chemically inert toward alkylene oxides are used as solvent.

5. The process as claimed in claim 1, wherein step b) is carried out in the presence of an alkaline catalyst.

6. The process as claimed in claim 1, wherein a catalyst is used in step b) in an amount of from 0.1 to 3.0% by weight, based on the weight of all H-functional starter substances.

7. The process as claimed in claim 1, wherein said alkylene oxide is at least one selected from the group consisting of ethylene oxide, propylene oxide and/or butylene oxide.

8. The process of claim 1, wherein said solvent is present in a ratio of starter substance to polyether alcohol of 1:20 to 20:1.

9. The process of claim 1, wherein said at least one amino group which is catalytically active in the urethane reaction is a tertiary amino group.

10. The process of claim 1, wherein said at least one group which is reactive toward alkylene oxides is at least one group selected from the group consisting of a primary amino group, a secondary amino group and a hydroxyl group.

11. The process of claim 1, wherein reacting is carried out so that an average of 1 to 8 molecules of alkylene oxide are added onto each active hydrogen atom of said starter substance.

12. The process of claim 1, wherein reacting is carried out so that an average of 2 to 4 molecules of alkylene oxide are added onto each active hydrogen atom of said starter substance.

13. The process of claim 1, wherein reacting is carried out at a pressure of 0.1 to 1.0 MPa and a temperature of 80 to 140° C.

14. The process of claim 1, wherein reacting comprises an after-reaction phase.

15. The process of claim 1, wherein the starter substances containing at least one amino group which is catalytically active toward the urethane reaction, and at least one group which is reactive toward alkylene oxides, are selected from the group consisting of dimethylaminoethylamine, dimethylaminopropylamine, diethylaminoethylamine, diethylaminopropylamine, dimethylethanolamine, N,N-dimethylaminoethyl N'-methyl-N'-hydroxyethylaminoethyl ether, N,N-dimethylaminoethoxyethanol, N-(3-aminopropyl)imidazole, N-(2-dimethylaminoethyl)-N-methylethanolamine, and mixtures of at least two of the compounds mentioned.

16. A polyether alcohol prepared by the process as claimed in claim 1.

17. A process for producing polyurethanes comprising reacting polyisocyanates with compounds having at least two hydrogen atoms which are reactive toward isocyanate groups, wherein a polyether alcohol as claimed in claim 10 is used as catalyst.

* * * * *